(12) United States Patent
Yun

(10) Patent No.: US 10,467,431 B2
(45) Date of Patent: *Nov. 5, 2019

(54) APPARATUSES, SYSTEMS, METHODS, AND COMPUTER READABLE MEDIA FOR PROVIDING SECURE FILE-DELETION FUNCTIONALITY

(71) Applicant: NAVER Business Platform Corp., Seongnam-Si, Gyeonggi-Do (KR)

(72) Inventor: Geun Yong Yun, Seongnam-si (KR)

(73) Assignee: NAVER Business Platform Corp., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,378

(22) Filed: Nov. 30, 2017

(65) Prior Publication Data

US 2018/0082081 A1 Mar. 22, 2018

Related U.S. Application Data

(63) Continuation of application No. 14/957,916, filed on Dec. 3, 2015, now Pat. No. 9,852,308.

(30) Foreign Application Priority Data

Dec. 11, 2014 (KR) .................. 10-2014-0178700

(51) Int. Cl.
*G06F 21/62* (2013.01)
*G06F 3/06* (2006.01)
*G06F 16/16* (2019.01)

(52) U.S. Cl.
CPC ........ *G06F 21/6245* (2013.01); *G06F 3/0652* (2013.01); *G06F 16/162* (2019.01); *G06F 21/6209* (2013.01); *G06F 2221/2143* (2013.01)

(58) Field of Classification Search
CPC ............ G06F 3/0652; G06F 17/30117; G06F 2221/2143; G06F 16/162
See application file for complete search history.

(56) References Cited

U.S. PATENT DOCUMENTS 7,303,135 B2  12/2007  Nakabe et al.
7,739,315 B2  6/2010  Haga
(Continued)

FOREIGN PATENT DOCUMENTS

JP  H10340232 A  12/1998
JP  2004-259265 A  9/2004
(Continued)

OTHER PUBLICATIONS

Korean Office Action 10-2014-0178700 dated Sep. 23, 2015.
(Continued)

*Primary Examiner* — Madhuri R Herzog
(74) *Attorney, Agent, or Firm* — Harness, Dickey & Pierce, P.L.C.

(57) ABSTRACT

A secure file-deletion function providing apparatus includes a request input unit configured to receive a file deletion request to delete a file stored in an apparatus from a user; a file deletion unit for deleting the file included in the file deletion request, and a secure file-deletion unit for overwriting a region including a region that stores the file with a dummy value in order to make it more difficult and/or impossible to recover the file deleted by the file deletion unit.

7 Claims, 4 Drawing Sheets

(56) References Cited

U.S. PATENT DOCUMENTS

| | | | |
|---|---|---|---|
| 8,438,194 B2 | 5/2013 | Uno | |
| 9,104,685 B2 | 8/2015 | Wang | |
| 2006/0272020 A1* | 11/2006 | Gardner | G06F 9/4411 726/23 |
| 2010/0138619 A1* | 6/2010 | Benavides | G06F 21/6218 711/159 |
| 2011/0145306 A1* | 6/2011 | Boyd | G06F 12/0246 707/824 |
| 2016/0300069 A1* | 10/2016 | Anil | G06F 21/62 |

FOREIGN PATENT DOCUMENTS

| | | | |
|---|---|---|---|
| JP | 2008070975 A | | 3/2008 |
| JP | 2010231569 A | | 10/2010 |
| JP | 2014523596 A | | 9/2014 |
| KR | 100380824 B1 | | 4/2003 |
| KR | 100898968 B1 | | 5/2009 |
| KR | 101029218 B1 | | 4/2011 |
| KR | 101055287 B1 | | 8/2011 |
| TW | 201034018 A | | 9/2010 |
| WO | WO-2010002185 A2 | | 1/2010 |

OTHER PUBLICATIONS

Korean Notice of Allowance dated Mar. 2, 2016 in Korean Patent Application No. 10-2014-0178700.
Japanese Office Action dated Nov. 1, 2016 for corresponding Japanese Patent Application No. 2015-235847.
"Windows PC," vol. 11, No. 10, Japan, 2006, pp. 75-82.
Taiwanese Office Action dated Apr. 14, 2017 for corresponding Taiwanese Patent Application No. 104141600 and English translation.
Mallery, John R. "Secure file deletion: Fact or fiction?." SANS Institute. Retrieved (Oct. 12, 2006): 2009.
Notice of Allowance dated Jan. 26, 2017 for corresponding Korean Application No. 10-2015-0158997, which is a Divisional Application of corresponding Korean Application No. 10-2014-0178700.

* cited by examiner

APPARATUSES, SYSTEMS, METHODS, AND COMPUTER READABLE MEDIA FOR PROVIDING SECURE FILE-DELETION FUNCTIONALITY

CROSS-REFERENCE TO RELATED APPLICATIONS

This is a continuation of U.S. application Ser. No. 14/957,916, filed on Dec. 3, 2015, which claims priority under 35 U.S.C. § 119 to Korean Patent Application No. 10-2014-0178700, filed on Dec. 11, 2014, in the Korean Intellectual Property Office (KIPO), the entire contents of each of which is incorporated herein by reference.

BACKGROUND

1. Field

One or more example embodiments relate to apparatuses, methods, systems, and/or computer programs stored on non-transitory computer readable media for providing a secure file-deletion function. More particularly to, apparatuses, methods, systems, and/or computer programs stored on non-transitory for providing a secure file-deletion function that makes file recovery more difficult and/or impossible.

2. Description of the Related Art

A function of an existing portable terminal used to be restricted to phone calls in order to secure portability and mobility. However, recently released portable terminals (e.g., smart phone, tablet, wearable device, camera, etc.) are embedded with near distance communication modules, universal serial bus (USB) ports, mass capacity memory, and/or high performance camera modules in order to meet various demands of users, and thus the recently released portable terminals have been transformed into total multimedia devices capable of various functions such as browsing the Internet, mass data storage, video recording and/or photographing, etc.

However, when a portable terminal used to store personal information of a user and confidential data is lost, even if data of the portable terminal was deleted prior to the loss of the portable terminal, the data can be easily recovered through the use of a data recovery computer program. In this case, the user's personal information, photos, videos, Internet browsing history, and/or other confidential information stored in the portable terminal may be exposed to a third party, which may result in severe damage due to the leaked data and/or accessed data.

Furthermore, because a user does not directly access the file system of the portable terminal (e.g., smart phone, tablet, wearable device, camera, etc.), and cannot directly delete personal information and/or confidential files, and/or even if the user deletes a file or an application stored in the portable terminal through a file management application installed on the portable terminal, the file may not be completely deleted or may be recoverable through various publicly available recovery programs, there is a risk of confidential and/or private data stored in the recovered file being leaked and/or accessed.

SUMMARY

One or more example embodiments provide a file-deletion function for making it possible to overwrite a physical storage region on a storage device that stores at least one file with a dummy value.

One or more example embodiments provide a file-deletion function for making it more difficult and/or impossible to recover data from a metadata region of a file stored on a storage device.

One or more example embodiments provide a file-deletion function for making it more difficult and/or impossible to recover a file that was deleted from a storage device by changing data included in the file to a dummy value before deleting the file from the storage device.

Additional aspects will be set forth in part in the description which follows and, in part, will be apparent from the description, or may be learned by practice of the presented example embodiments.

According to one or more example embodiments, a method of securely deleting a file may include receiving, using at least one processor, a file deletion request, the file deletion request including file information for a file to be deleted that is stored on a storage device of an apparatus, deleting, using the at least one processor, the file associated with the file information, and overwriting, using the at least one processor, a storage region of the storage device, the storage region including a location that stores the file with a desired value.

The method may further include creating, using the at least one processor, a first file having a size based on a size of the file to be deleted, and deleting, using the at least one processor, the first file.

The method may further include creating, using the at least one processor, a first file having a same filename as the file to be deleted, and deleting, using the at least one processor, the first file.

The method may further include calculating, using the at least one processor, a size of an available storage space on the storage device after deleting the file to be deleted, creating, using the at least one processor, a second file having a size based on the calculated size of the available storage space, and deleting, using the at least one processor, the second file.

The method may include storing, using the at least one processor, a third file including the desired value in a same directory as a directory that stores the file to be deleted on the storage device, and deleting, using the at least one processor, the third file.

The method may further include deleting, using the at least one processor, data included in the file to be deleted before the file to be deleted is deleted, or storing, using the at least one processor, the desired value in the file to be deleted.

The method may further include deleting, using the at least one processor, data included in the file to be deleted, or storing, using the at least one processor, the desired value in the file to be deleted before deleting the file to be deleted.

According to one or more example embodiments, there may be a non-transitory computer-readable recording medium having stored thereon a computer program that when executed by a processor configures the processor to perform the secure file-deletion function providing method.

According to one or more example embodiments, an application distribution system may include a memory having computer readable instructions stored thereon, and at least one processor configured to execute the computer readable instructions to transmit an application to a terminal, and the application, when executed, configures the terminal to receive a file deletion request, the file deletion request including file information for a file to be deleted that is stored on a storage device of the terminal, delete the file associated with the file information, and overwrite a location of the storage device in which the file to be deleted is stored with a desired value.

The terminal may further create a first file having a size based on a calculated size of the file to be deleted, and delete the first file.

The creating the first file may further include naming the first file with a same filename as a name of the file to be deleted.

The terminal may further calculate a size of an available storage space on the storage device after deleting the file to be deleted, create a second file having a size based on the calculated size of the available storage space, and delete the second file.

The terminal may further store a third file including the desired value in a same directory as a directory that stores the file to be deleted on the storage device, and delete the third file.

The terminal may further delete data included in the file to be deleted before deleting the file to be deleted, and store the desired value in the file to be deleted.

According to one or more example embodiments, a secure file-deletion function providing apparatus may include a memory having stored thereon computer readable instructions, and at least one processor configured to execute the computer readable instructions to receive a file deletion request to delete a file stored in the memory, delete the file included in the file deletion request, and overwrite a memory region including a location where the file is stored with the desired value.

According to one or more example embodiments, an apparatus for providing secure file deletion functionality may include a memory configured to store computer readable instructions and at least one file, and at least one processor configured to execute the computer readable instructions to receive a secure data modification instruction, the secure data modification instruction including file information related to at least one desired file to be securely modified, determine whether the file information is associated with a file of the at least one files stored on the memory, modify metadata related to the determined file based on the received secure data modification instruction, and delete the determined file from the memory.

The file information may include at least one of a file name of the desired file, a file storage start location address of the desired file, a file system link of the desired file, a resource locator of the desired file, a file system entry of the desired file, a database entry of the desired file, and a file size of the desired file.

The secure data modification instruction may include instructions for at least one of a secure delete operation, a metadata deletion operation, a modify file content operation, and a calculate available space of the memory operation.

The file information may include information related to a file directory including the desired file, the modifying the metadata may include modifying metadata related to the file directory, and the deleting the desired file may include deleting the file directory.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
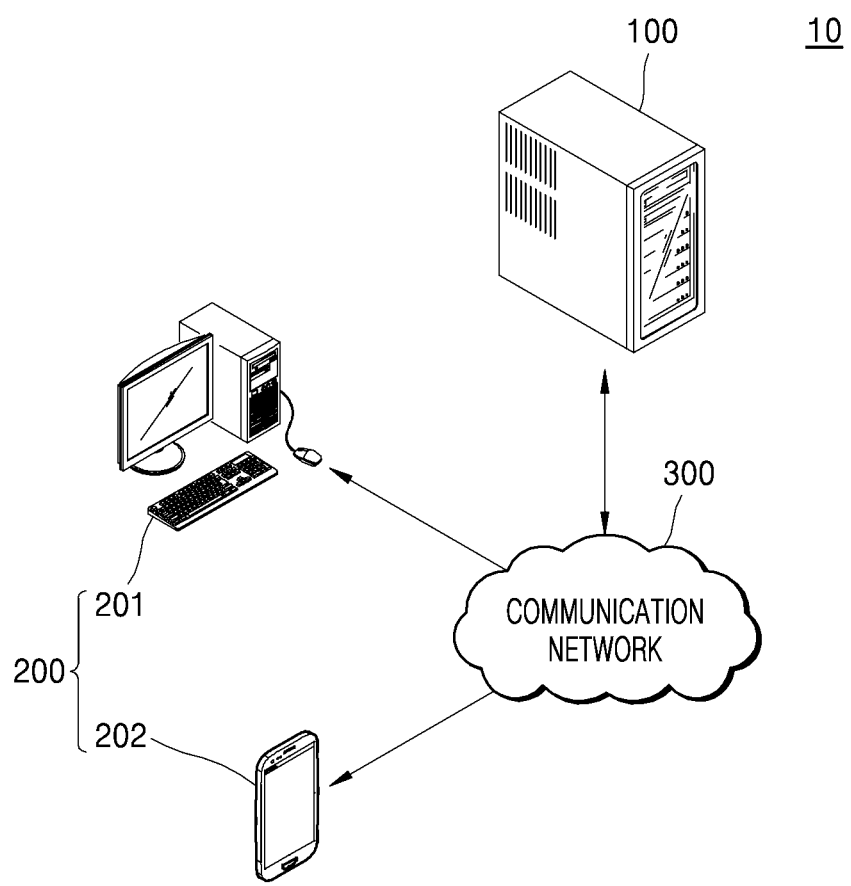
FIG. 1 is a diagram of a secure file-deletion function providing system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another element, component, region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In the present specification, a physical storage region is a part of a memory apparatus and/or storage device, such as a hard disk drive, a solid state drive, a rewriteable optical disk, a tape storage device, a floppy disk, a read-only memory (ROM), a random access memory (RAM), a flash memory, a networked drive and/or networked storage device (e.g., a cloud computing drive, a distributed file system, etc.), etc., in which data is actually stored. The physical storage region may be usually accessed via an address allocated to the region.

FIG. 1 is a diagram of a secure file-deletion function providing system 10 according to at least one example embodiment.

Referring to FIG. 1, a secure file-deletion function providing apparatus 200 and a distribution server 100 may be connected via a communication network 300 in the secure file-deletion function providing system 10 according to at least one example embodiment.

The secure file-deletion function providing apparatus 200 may perform a function of deleting a selected file in response to a file deletion request (and/or secure data modification instruction) received from a user, another secure file-deletion function providing apparatus, external computing device, etc., in order to make it more difficult and/or impossible to recover the deleted file. The secure file-deletion function providing apparatus 200 may completely (e.g., securely) delete the file stored in a storage space so as to make it more difficult and/or impossible to recover the file. Additionally, the secure file-deletion function providing apparatus 200 may delete the file by overwriting a storage region that has stored the file thereon with a dummy value in order to make it more difficult and/or impossible to recover the file. Additionally, the secure file-deletion function providing apparatus 200 may delete the file by overwriting a storage region that has stored metadata related to the file with the dummy value in order to make it more difficult and/or impossible to recover the file and/or metadata. In this regard, the metadata related to the file is data that is generated to facilitate access to the file in a file system and/or data that describes or provides additional information regarding the file. The secure file-deletion function providing apparatus 200 may delete a file that is requested to be deleted by replacing data included in the file with a dummy value (e.g., a desired value, a garbage value, etc.), thereby making it more difficult and/or impossible to recover the file.

In this regard, the secure file-deletion function providing apparatus 200 may correspond to at least one special-purpose processor or may include one or more special-purpose processors. Accordingly, the secure file-deletion function providing apparatus 200 may be included in another hardware apparatus such as a microprocessor or a computer system. For example, the secure file-deletion function providing apparatus 200 may be embedded in a terminal (e.g., a personal computer (PC) 201, a laptop computer (not shown), a smartphone 202, a tablet (not shown), a wearable smart device (not shown), an Internet-of-Things (IOT) device (not shown), a gaming console (not shown), a Personal Digital Assistant (PDA) (not shown), a camera (not shown), etc.) including a display unit capable of displaying a screen. While only two secure file-deletion function providing apparatuses 200 (201 and 202) are illustrated in FIG. 1, the example embodiments are not limited thereto, and any number of secure file-deletion function providing apparatus 200 may be present in the various example embodiments.

The secure file-deletion function providing apparatus 200 may be embedded in a terminal including a file system or in a terminal in which the file system is automatically mounted when the terminal is booted. In this regard, mounting is an operation of connecting a specific computing device and/or computing component (e.g., disk drive, peripheral, etc.) and a specific directory on the operating system (OS) executing on the terminal in order to use the specific device and/or component as the specific directory and may include an operation to access the directory within the file system. The OS may be configured to automatically mount the file system upon the OS boot-up. There may be OSes in which the file system may be manually mounted after being booted, such as Linux. The secure file-deletion function providing system 10 according to at least one example embodiment may be applied without limitation to the type of OS used.

The file system is configured to control how data (e.g., files, information, materials, etc.) is stored, organized, and/or retrieved from the terminal via the OS. The file system may manage physical locations (and/or logical locations) of files and/or data stored on a physical storage apparatus, such as a hard disk, a solid state drive, a rewriteable optical disk, a tape storage device, a floppy disk, a read-only memory (ROM), a random access memory (RAM), a flash memory, etc., and may include providing access to materials on a file server, cloud computing system, a distributed file system, or other networked computing device, through a client that performs a network protocol (e.g., NFS, SMB, 9P, etc.) and providing only virtual access. The file system may include a structure or a system necessary for determining, reading, writing, deleting, executing, and accessing a set of files, directories, and locations that are generally used to maintain and manage naming, storing, and organizing of the files, and may include a set of files stored in a physical or logical memory apparatus or storage device, such as a disk or a diskette and file management structures, and may be a part of an OS that manages a file system.

File system operations, such as creating, deleting, modifying, moving, renaming, accessing, executing, etc., files and directories stored on a computer may be managed using the metadata of the files through the file system. The file system may access a physical (or logical) storage region that stores files, directories, etc. by using data stored in the related metadata. In this regard, the metadata may be data including an actual file name, a file storage start location address, a hard or soft file system link, a resource locator (e.g., URL), a file system entry, a database entry, a file size, etc.

If the file system deletes a file stored on a storage device of the terminal (e.g., a hard disk, RAM, ROM, etc.), a mobile storage apparatus (e.g., a universal serial bus (USB) memory thumb drive, an externally connected storage drive, etc.), and/or a networked storage apparatus (e.g., a cloud storage drive, a networked drive, a distributed file system, etc.), the file system may not delete the file from the physical storage region that stores the file, but may instead delete only the metadata associated with the file (e.g., information regarding the name of the file that is to be deleted, a storage region start address, a hard or soft file system link, a resource locator (e.g., URL), a file system entry, a database entry, a size of the file, etc.). In other words, the file system may only logically delete the file, and leave the file remaining on the physical memory device. The file structure of the files and directories stored on the terminal, computing system, etc., may be created based on the metadata of the file system and may logically be the same as deleting a file that is not present in the metadata.

The distribution server 100 may distribute an application code in which a secure file-deletion function is transmitted to, downloaded from, installed from, embedded to, etc., the secure file-deletion function providing apparatus 200. While only a single distribution server 100 is illustrated in FIG. 1, the example embodiments are not limited thereto, and any number of distribution server 100s may be present in the various example embodiments.

The communication network 300 may connect the one or more secure file-deletion function providing apparatuses 200 and the distribution server 100. That is, the communication network 300 may provide a connection path for the secure file-deletion function providing apparatus 200 that accesses the distribution server 100 to transmit and receive data. The communication network 300 may be any communication and/or data network, such as the Internet, an intranet, a wide area network (WAN), a local area network (LAN), a personal area network (PAN), a radio data network, a wireless network, a wired network, a phone network, a satellite communications network, etc.

Figure 2:
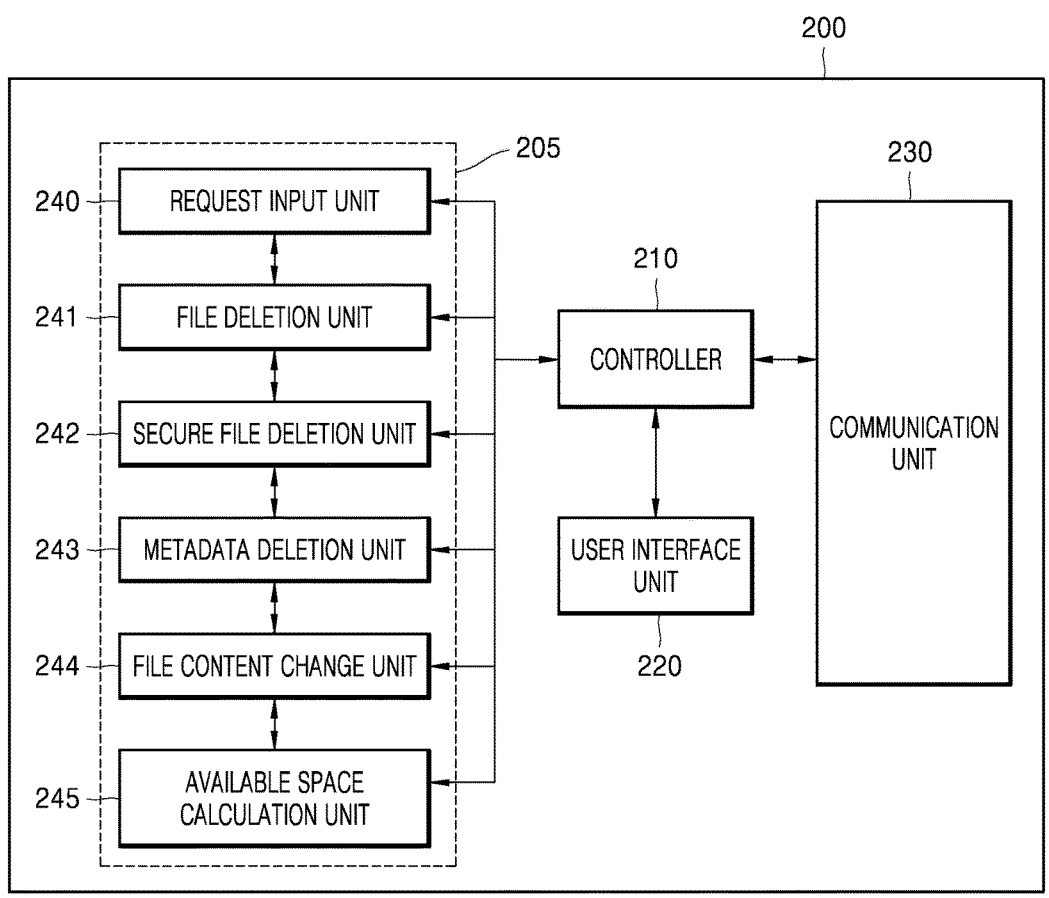
FIG. 2 is a block diagram of a secure file-deletion function providing apparatus according to at least one example embodiment.

FIG. 2 is a block diagram of the secure file-deletion function providing apparatus 200 according to at least one example embodiment. Referring to FIG. 2, the secure file-deletion function providing apparatus 200 may include a memory 205, a controller 210, a user interface unit 220, and a communication unit 230.

The memory 205 stores a program (e.g., computer readable instructions) that causes the controller 210 to implement a specific function(s), such as functionality and/or operations related to a request input unit 240, a file deletion unit 241, a secure file-deletion unit 242, a metadata deletion unit 243, a file content change unit 244, and/or an available space calculation unit 245.

The controller 210 includes at least one processing device, such as a central processing unit (CPU) or other processor, and may be configured to display a screen (not shown) on the user interface unit 220 and receive a user input of various instructions or operations through the screen. The controller 210 may be configured to access and/or execute programs, functions, instructions, and data stored on the memory 205. Once the program (e.g., computer readable instructions) is loaded into the controller 210, the controller 210 executes the program (e.g., computer readable instructions), thereby transforming the controller 210 into a special purpose processor. The controller 210 may be implemented as one or more processors, one or more processor cores, a distributed processing system, a network processing system, a cloud processing system, etc.

The user interface unit 220 may simultaneously receive an input signal from a user and output an output signal to the user and may include a keyboard, a mouse, a monitor, an imaging unit, a sound input unit, etc. The user interface unit 220 may be a touch screen of a smartphone, a tablet, a personal computer, etc.

The communication unit 230 (e.g., a network transceiver, etc.) may connect the distribution server 100 and the secure file-deletion function providing apparatus 200 over a communication network and may perform a data transmission and reception function.

The request input unit 240, when loaded into and executed by the controller 210, may cause the controller 210 to receive a file deletion request (and/or secure data modification instruction) from the user, another secure file-deletion function providing apparatus, external computing device, etc. through the user interface unit 220 and/or the communication unit 230. In this regard, the file deletion request may be a request to delete at least one of stored files and may information related to the file to be deleted and/or metadata related to the file to be deleted, such as a file name that is information of the file to be deleted, a location directory that stores the file, a link (hard or soft) to the file, a resource locator for the file, a database entry for the file, a file system entry for the file, etc. A user interface screen (e.g., graphical user interface, etc.) configured to receive the file deletion request may be generated and provided by the controller 210.

The file deletion unit 241, when loaded into and executed by the controller 210, may cause the controller 210 to delete the file corresponding to the file information included in the file deletion request. In this regard, the file deletion unit 241 may delete the file through a file system. The file deletion unit 241 may delete metadata of a file deleted by the file system as described above, but may not delete a file of a physical storage region that has actually stored the file.

The secure file-deletion unit 242, when loaded into and executed by the controller 210, may cause the controller 210 to delete the file in the physical storage region that has actually stored the file in order to make it more difficult and/or impossible to recover the deleted file. The secure file-deletion unit 242 may overwrite the physical storage region that has actually stored the file with a desired value, a dummy value, and/or garbage value, thereby making it more difficult and/or impossible to recover the deleted file.

For example, the desired value may be a binary value, such as a "1" or a "0," or may be a desired or random data pattern, that is repeated for the entire size of the file.

In various other example embodiments, the memory 205 of the secure file-deletion function providing apparatus 200 may further include the metadata deletion unit 243 that, when loaded into and executed by the controller 210, causes the controller 210 to create a first file having a size based on (associated with, related to, similar to, and/or the same as) the calculated size of the file deleted by the file deletion unit 241, and delete the first file. If the first file having the same size as the deleted file is created, the file system may generate metadata of the first file in the same region as the region that previously stored the metadata of the deleted file. That is, a physical storage region that has stored the metadata of the deleted file may be filled with the metadata of the created first file. Accordingly, the secure file-deletion unit 242 (through the controller 210) may change the content of the metadata stored in that region in order to make it more difficult and/or impossible to recover the information (e.g., location and address information) regarding the physical storage region that stored the deleted file by replacing that metadata information with the metadata information of the created first file. Thus, the secure file-deletion function providing apparatus 200 according to at least one example embodiment may not search for the physical storage region that has stored the deleted file, and thus the deleted file may not be recoverable. In various other example embodiments, the secure file-deletion function providing apparatus 200 may partially overwrite the physical storage region that has stored the metadata of the deleted file with the metadata of the first file.

In various other example embodiments, the memory 205 of the secure file-deletion function providing apparatus 200 may further include the available space calculation unit 245. The secure file-deletion unit 242, when loaded into and executed by the controller 210, may create a second file having a size of an available space calculated based on the size of a determined available space calculated by the available space calculation unit 245 (through the controller 210) and delete the second file. The secure file-deletion unit 242 (through the controller 210) may create and delete a mass capacity file that occupies some, most, or all of the available space, and thus a region in which no file (or previously deleted file) is present may be overwritten with a desired value, a dummy value, and/or a garbage value. For example, if the second file having a size of 90 percent of the available space of a storage space is created, since the physical storage region that has stored the deleted file is already included in the available space, the second file may be stored in the physical storage region that has stored the deleted file. That is, the second file may be stored in the physical storage region that is storing the deleted file. Accordingly, although a physical storage location of a deleted file is recovered, because the deleted file has been overwritten with a different value (e.g., the desired value, the dummy value, and/or the garbage value), the secure file-deletion function providing apparatus 200 according to at least one example embodiment may not recover the content of the original data of the deleted file.

In various other example embodiments, the memory 205 of the secure file-deletion function providing apparatus 200 may further include the file content change unit 244 that, when loaded into and executed by the controller 210, completely deletes data included in a file corresponding to the file information included in the file deletion request (and/or secure data modification instruction), and/or overwrites the data included in the file with a desired value, a dummy value, and/or garbage value. The secure file-deletion function providing apparatus 200 may overwrite the data included in the file with the desired value, the dummy value, and/or the garbage value, through the file content change unit 244 and controller 210 before deleting the file in response to the file deletion request (and/or secure data modification instruction) and may delete the file through the file deletion unit 241. If the data included in the file is changed to the desired value, the dummy value, and/or the garbage value, in the unlikely case where the deleted file is recovered, the content of the original data of the deleted file may not be recovered. In other words, the party may recover a changed data value stored in the file before deleting the desired file, but the original data of the file may not be recovered.

In various other example embodiments, the secure file-deletion unit 242 (through the controller 210) may store a third file having the desired value, the dummy value, and/or the garbage value as content in the same directory as the directory that stores the file corresponding to the file information included in the file deletion request (and/or secure data modification instruction). The file system may store files that are stored in the same directory in close (e.g., proximate) physical storage regions, and thus the third file created to be stored in the same directory as the directory of the deleted file may be stored in a region close (e.g., proximate) to the physical storage region of the deleted file, thereby overwriting a region that stores the deleted file with the new third file. That is, the secure file-deletion function providing apparatus 200 according to at least one example embodiment may completely delete the file in order to make it more difficult and/or impossible to recover the deleted file.

Figure 3:
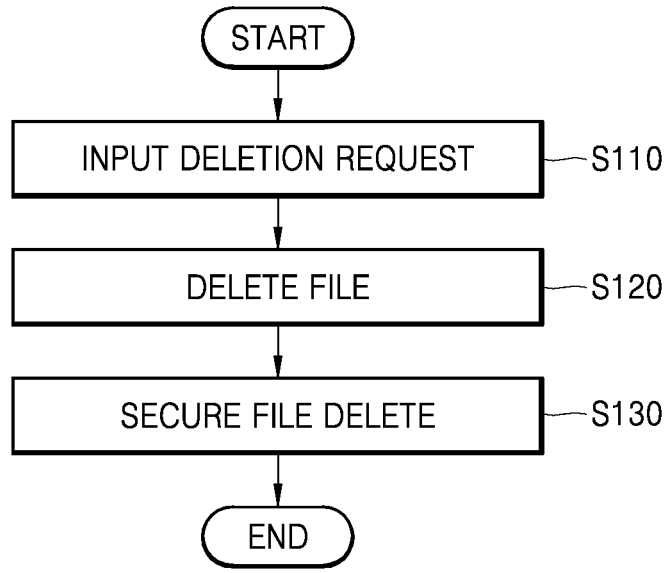
FIGS. 3, 4, 5, and 6 are flowcharts for describing operations of a secure file-deletion function providing apparatus, such as the apparatus of FIG. 2, according to at least one example embodiment.

While various units and components are illustrated in FIG. 3, the example embodiments are not limited thereto, and any number of units and/or components may be present in the various example embodiments. FIGS. 3, 4, 5 and 6 are flowcharts for describing operations of the secure file-deletion function providing apparatus 200 according to some example embodiments.

Referring to FIG. 3, the secure file-deletion function providing apparatus 200 may include a deletion request input operation S110, a file deletion operation S120, and a secure file-deletion operation S130, according to at least one example embodiment.

In operation S110, the secure file-deletion function providing apparatus 200 may receive a file deletion request (and/or secure data modification instruction) from a user, another secure file-deletion function providing apparatus, external computing device, etc.

In operation S120, the secure file-deletion function providing apparatus 200 may delete a file corresponding to file information included in the file deletion request (and/or secure data modification instruction).

In operation S130, the secure file-deletion function providing apparatus 200 may delete the file in a physical storage region that has stored the file in order to make it more difficult and/or impossible to recover the deleted file. In this regard, the secure file-deletion function providing apparatus 200 may overwrite the physical storage region that has stored the deleted file with a desired value, a dummy value, and/or a garbage value, thereby making it more difficult and/or impossible to recover the deleted file.

Figure 4:
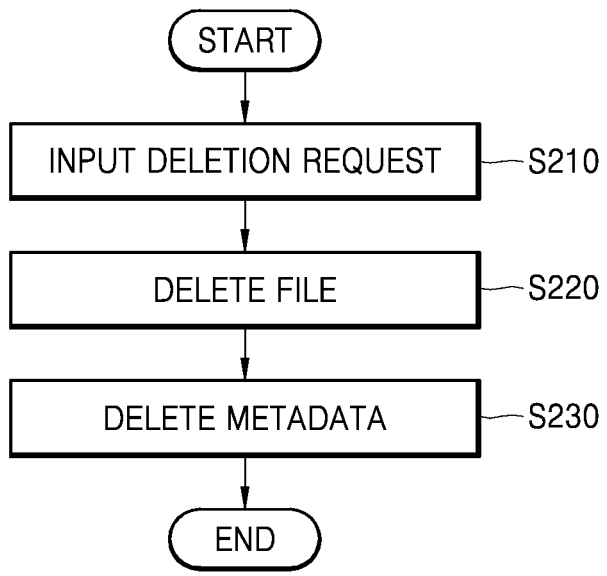

Referring to FIG. 4, the secure file-deletion function providing apparatus 200 may include a deletion request input operation S210, a file deletion operation S220, and a metadata deletion operation S230, according to at least one example embodiment.

Operations S210 and S220 are the same as operations S110 and S120, and the detailed descriptions thereof are omitted here.

In operation S230, the secure file-deletion function providing apparatus 200 may create a first file having a size based on (associated with, related to, similar to, and/or the same as) the calculated size of the deleted file and then delete the first file. If the first file having the same size as the deleted file is created, a file system will create metadata of the first file in the same region as a region that has stored the metadata of the deleted file. That is, a physical storage region that has stored the metadata of the deleted may be filled with the metadata of the first file.

Figure 5:
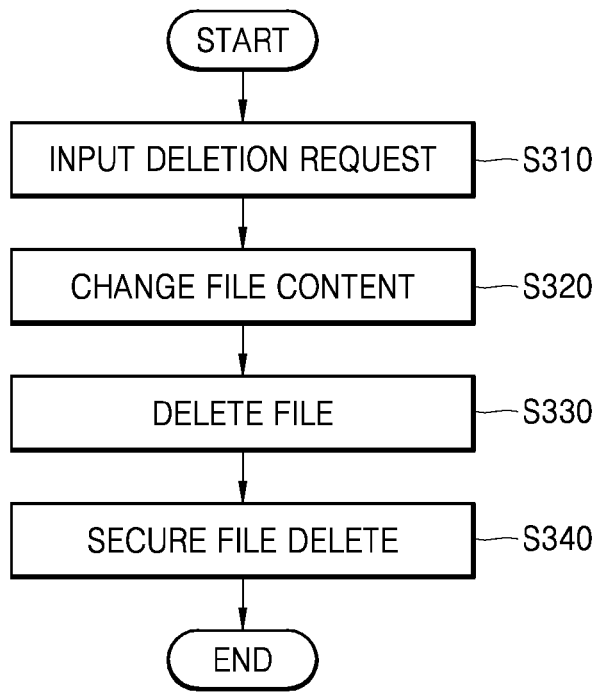

Referring to FIG. 5, the secure file-deletion function providing apparatus 200 may include a deletion request input operation S310, a file content change operation S320, a file deletion operation S330, and a secure file-deletion operation S340, according to at least one example embodiment.

Operations S310, S330, and S340 are the same as operations S110, S120, and S130, and the detailed descriptions thereof are omitted here.

In operation S330, the secure file-deletion function providing apparatus 200 may delete data included in a file corresponding to file information included a file deletion request (and/or secure data modification instruction), and/or may overwrite the data included in the file with a desired value, a dummy value, and/or a garbage value. The secure file-deletion function providing apparatus 200 may overwrite the data included in the file with a different value (e.g., the desired value, the dummy value, and/or the garbage value) and then delete the file.

In various other example embodiments, the secure file-deletion function providing apparatus 200 may delete the file without the secure file-deletion operation S340.

Figure 6:
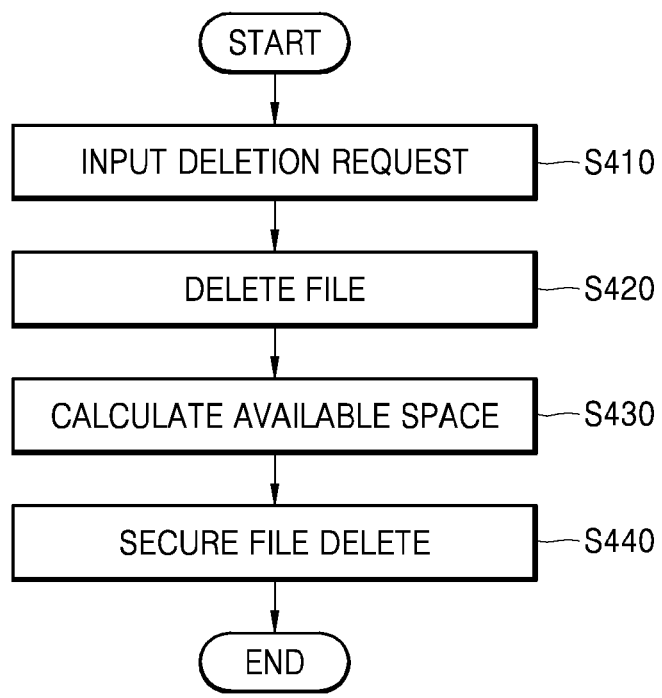

Referring to FIG. 6, the secure file-deletion function providing apparatus 200 may include a deletion request input operation S410, a file deletion operation S420, an available space calculation operation S430, and a secure file-deletion operation S440, according to at least one example embodiment.

Operations S410, S420, and S440 are the same as operations S110, S120, and S130, and the detailed descriptions thereof are omitted here.

In operation S430, the secure file-deletion function providing apparatus 200 may calculate a size of an available space of a storage device. The secure file-deletion function providing apparatus 200 may create a second file having a size based on (associated with, related to, similar to, and/or the same as) the calculated size of the available space and then delete the second file. For example, if the second file having a size of 90 percent of the available space of the storage space is created, the physical storage region that has stored the deleted file will be included in the available space of the storage device, and the second file will be stored in the physical storage region that previously stored the deleted file. That is, the physical storage region that has stored the deleted file may be overwritten with the second file. Accordingly, although a physical storage location of the deleted file may be recovered by recovering metadata of the deleted file, because the deleted file has been overwritten with a different value, the content of original data of the deleted file may not be recoverable.

The above-described file or metadata deletion operations S120, S220, S230, S330, S340, S420, and S440 may be repeatedly performed more than two times. Accordingly, a secure file-deletion function providing method according to at least one example embodiment may delete a file to make a file recovery more difficult and/or impossible.

As described above, one or more of the above example embodiments may provide a file-deletion function for making it possible to overwrite a physical storage region that stores a file with a dummy value.

According to one or more of the above example embodiments may also provide a file-deletion function for making it more difficult and/or impossible to recover a metadata region of a file.

According to one or more of the above example embodiments may also provide a file-deletion function for making it more difficult and/or impossible to recover a file by changing data included in the file to a dummy value before deleting the file.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of securely deleting a file, the method comprising:
   receiving, using at least one processor, a file deletion request, the file deletion request including file information of a desired file to be deleted that is stored on a storage device of an apparatus;
   replacing, using the at least one processor, content of original data of the desired file with a first desired value;
   deleting, using the at least one processor, the desired file associated with the file information;
   overwriting, using the at least one processor, a storage region of the storage device with the first desired value, the storage region including a location that stores the desired file;
   calculating, using the at least one processor, a size of an available storage space on the storage device after deleting the desired file;
   creating, using the at least one processor, a second file having a size based on the calculated size of the available storage space;
   deleting, using the at least one processor, the second file,
   storing, using the at least one processor, a third file including a second desired value in a same directory as a directory that stores the desired file on the storage device; and
   deleting, using the at least one processor, the third file.

2. The method of claim 1, further comprising:
   creating, using the at least one processor, a first file having a size based on a size of the desired file; and
   deleting, using the at least one processor, the first file.

3. The method of claim 1, further comprising:
   creating, using the at least one processor, a first file having a same filename as the deleted desired file; and
   deleting, using the at least one processor, the first file.

4. A non-transitory computer-readable recording medium having stored thereon a computer program, which when executed by at least one processor, causes the at least one processor to perform the method of claim 1.

5. An application distribution system comprising:
a memory having computer readable instructions stored thereon; and
at least one processor configured to execute the computer readable instructions to,
transmit an application to a terminal, and
the application, when executed, configures the terminal to,
receive a file deletion request, the file deletion request including file information of a desired file to be deleted that is stored on a storage device of the terminal,
replace content of original data of the desired file with a first desired value,
delete the desired file associated with the file information,
overwrite a location of the storage device in which the desired file is stored with the first desired value,
calculate a size of an available storage space on the storage device after deleting the desired file,
create a second file having a size based on the calculated size of the available storage space,
delete the second file,
store a third file including a second desired value in a same directory as a directory that stores the desired file on the storage device, and
delete the third file.

6. The application distribution system of claim 5, wherein the terminal is further configured to:
create a first file having a size based on a calculated size of the desired file; and
delete the first file.

7. The application distribution system of claim 5, wherein the terminal is further configured to:
create a first file having a same filename as the deleted desired file; and
delete the first file.

* * * * *